April 15, 1969  T. N. MILLHOFF  3,438,755
WELDING WIRE
Filed Oct. 19, 1966
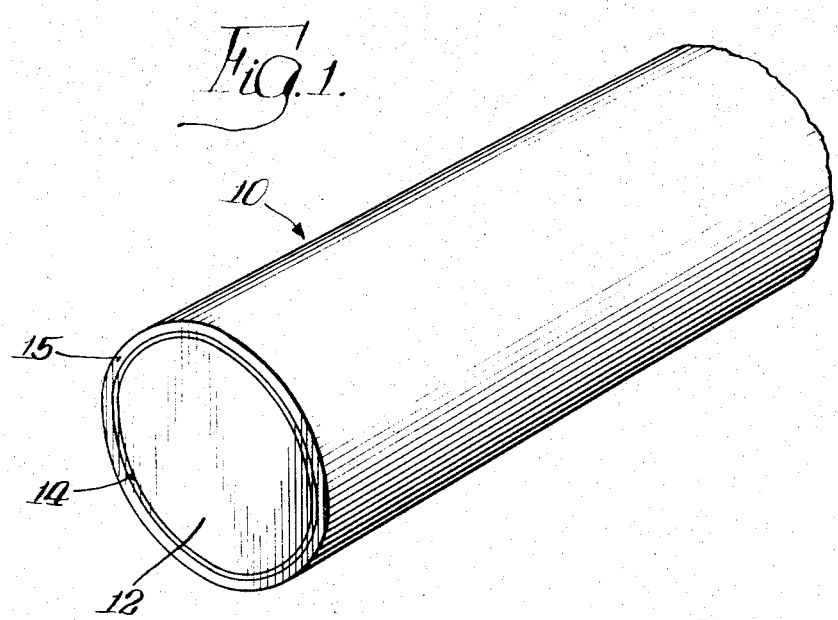
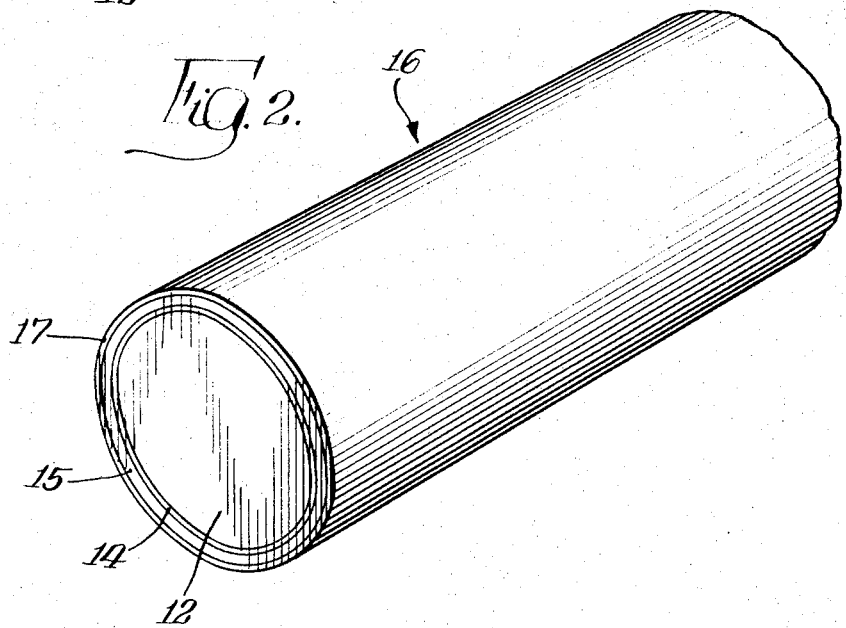
Inventor:—
Thomas N. Millhoff,
By Broun, Jackson, Boettcher & Dienner
Attys.

United States Patent Office 3,438,755
Patented Apr. 15, 1969

3,438,755
WELDING WIRE
Thomas N. Millhoff, Niles, Mich., assignor to National-Standard Company, Niles, Mich., a corporation of Delaware
Filed Oct. 19, 1966, Ser. No. 587,746
Int. Cl. B22d 19/08
U.S. Cl. 29—183.5                5 Claims This invention relates to welding wire and more particularly to steel welding wire or rod coated in a novel manner to provide a remarkably improved weld bead compared to weld beads of known welding materials.

It is known in the art of welding that the toughness and strength of a finished weld is determined to a great extent by the porosity of the weld obtained. It is known that the extent of porosity of the weld will vary with the extent to which both the iron of the work piece and that of the welding wire is de-oxidized. To reduce oxidation during the welding process it is necessary to protect the molten welding metal and the material being welded from the action of oxygen of the atmosphere. Previous methods of welding have carried out the welding process in a controlled gaseous environment to protect the molten welding metal from oxygen of the atmosphere. These methods have, however, been unsatisfactory due to the creation of undesirable gases or the danger derived from using poisonous non-oxidizing gases.

In carrying out either an open flame or electric arc-welding process within an environment of atmospheric gases, it is a conventional practice to incorporate manganese as an ingredient in steel welding wire to improve weldments. It has been found that the addition of manganese to the steel welding wire helps to provide a non-oxidizing environment within the molten puddle of weld and to add toughness and strength to the finished weld. The addition of manganese into the molten metal from which the steel welding wire is made in the amount of not more than about 1.3 percent by weight can be accomplished at little additional cost in the production of the welding wire. However, where a higher manganese content is desired, the price of the weld wire is increased appreciably.

It has been proposed in view of the foregoing that a welding wire having the desired amount of manganese may be attained by providing a coating of manganese, as by electro-deposition, cementation or powder metal techniques, on the welding rod or wire which coating is of such a thickness as to provide the total amount of manganese by weight desired in the welding wire. Typically, the percent by weight of manganese in a particular heat of steel is determined and the weld wire made therefrom is then provided with a coating of manganese to attain the aforementioned predetermined desired percentage of manganese for the weld wire. For example, if a given heat of steel contained 1 percent manganese by weight and it is desired to have a 2 percent manganese by weight steel weld wire, the weld wire made from the molten steel would then be coated with manganese to attain the 2 percent manganese, i.e., the manganese coating would add 1 percent by weight of manganese to the welding wire.

It has been found that the direct coating of manganese on steel wire is unsatisfactory. For example, it is difficult to obtain good adhesion of the manganese to the steel wire with the result that when the coated wire is wrapped around its own diameter the manganese coating will crack and peel off the steel wire.

The present invention stems from the discovery that if the steel wire is first provided with a metal coating, such for example, as of copper or a copper alloy, that the manganese coating may be easily and economically applied to the wire. Importantly it has been found that inexpensive steel wire may be used for fabricating the welding wire of the present invention.

Aside from the last noted advantage it has further been unexpectedly observe that a weld bead formed from the weld wire of the present invention is characterized by a smooth and regular outer surface, and in which the weld bead has highly uniform solidification lines along its lateral edges. In addition tests have shown that copper coating of the steel provides for extremely good adhesion of the manganese coating and that cracking and peeling off of the manganese coating is virtually eliminated.

It is an object of the present invention to provide steel welding wire or rod having a first metal coating thereon providing a substrate for a coating of manganese.

A further object of the invention is to provide steel welding wire or rod as last noted in which a metal coating is applied over the manganese coating to prevent oxidization of the latter and/or to facilitate feeding of the welding wire in welding apparatus.

Preferred embodiments of the invention will now be described in connection with the accompanying drawing in which—

FIGURE 1 is a perspective view of a segment of one embodiment of a welding wire in accordance with the present invention; and FIGURE 2 is a perspective view of a segment of another embodiment of a welding wire in accordance with the present invention.

Referring now to FIGURE 1 of the drawing, a welding wire, designated generally at 10, includes a central weld wire matrix or core portion 12 produced in a conventional manner from a heat of molten steel. The matrix portion or core 12 preferably includes a small percentage of manganese and silicon, the percentage of manganese being economically limited to not more than about 1.3 percent by weight.

An example of a typical and known steel wire suitable as a matrix or core 12 of the welding wire according to the present invention includes the following elements:

Carbon _____ percent by weight __ 0.8–.13
Manganese _____ do ____ .90–1.30
Silicon _____ do ____ .45–.60
Sulphur _____ maximum percent by weight__     .035
Phosphorous _____ do ____      .025
Iron _____ The remainder Many other known wire compositions may be used in the present invention but they should preferably contain a minimum of .15 percent silicon by weight.

The welding wire 12 is shown having a cylindrical cross section but may be made to any desired cross sectional configuration, it being merely a matter of manufacturing design utilizing methods conventionally known in the art.

The steel matrix or core 12 according to the present invention is first coated with a metal coating 14, such as of copper or copper alloy such as bronze to define a substrate for the adhesion of a coating 15 of manganese. It will be understood that copper or copper alloy as used herein includes other metals and alloys well known in the art to function as a substrate for the adhesion of manganese to a steel wire.

In a typical specific example of the welding wire of the present invention the steel wire 12 may be of a diameter of .035 inch of the composition aforenoted having a coating 14 of copper or a copper alloy composed of 98% copper and 2% tin. The coating 14 when composed of copper may be in the range of 2.5 millionths to 50 millionths of an inch or higher to serve as a satisfactory substrate for the mangese coating 15. The substrate coating 14 may be applied to the steel wire 12 in any suitable manner such as by electro-deposition, cementation or powder metal techniques. By way of example, the aforementioned copper-tin alloy may be deposited by cementation on the steel wire 12 in a bronze plate bath under the following conditions:

| | |
|---|---:|
| $H_2SO_4$ ml./l | 31 |
| $CuSO_4 \cdot 5H_2O$ g./l | 72 |
| $SnSO_4$ g./l | .45 |
| Temperature of bath °F | 115 |
| Immersion time (approximately) sec | 1 |
| Coating wt. g./kg | .65–.80 |

After coating the substrate 14 on the steel wire 12, the manganese coating 15 may be applied over coating 14.

The manganese coating 15 may be applied by electro deposition, cementation or powder metal techniques. The manganese coating may be electro deposited in a bath under the following conditions.

| | |
|---|---:|
| Manganese sulphate dihydrate grams per liter | 100 |
| Ammonium sulphate do | 60 |
| Ammonium thiocyanate do | 60 |
| pH | 4–5.5 |
| Temperature °C | 25 |
| Current density amps. per square foot | 250 |

While the coating 15 of manganese may be substantially pure manganese, it will be understood that alloys of manganese may be deposited which would be effective to accomplish the objects of the present invention. For example, manganese alloyed respectively with iron, zinc, or cobalt could be coated over the substrate coating 14. Thus, it will be understood that the expression manganese as used herein means pure manganese or a coating containing sufficient manganese as herein described to achieve the objects of the invention, and further in a broader sense to include any metallic substance having the characteristic of preventing oxidization in a molten bath of the weld wire.

The thickness or depth of the manganese coating 15 will be determined by the percentage of manganese contained within the matrix or core 12 of welding wire 10 and the manganese content of the coating itself. The substrate coating 14 enables the application of a manganese coating over a wide range of thicknesses and even at a thickness of 90 millionths of an inch with the steel wire 12 of a diameter of .035 inch the weld wire may be bent 360° around its own diameter without cracking or peeling of the manganese coating 15. It is desirable that the total amount of manganese within the steel wire 12 and the coating 15 be maintained at a minimum of 1 percent by weight. It may be desirable to provide a coating which increases the manganese content of the welding wire by as high as 4 to 5 percent by weight when the welding wire is being used in open arc welding wherein there is no gas shield such as created by inert gases frequently utilized in electric arc welding.

In FIGURE 2 there is shown a weld wire 16 the same in all respects as described in FIGURE 1 but in which the manganese coating has been overplated with an outer metal coating 17. The outer coating 17 preferably is provided to prevent oxidation of the manganese coating 15 and/or to provide for ease of feed of the welding wire in welding apparatus. Copper or copper alloys or equivalents thereof known in the art are highly suitable for the outer coating 17 and may be applied to the desired thickness to achieve the foregoing purpose or purposes. Again, the outer coating 17 may be applied in any known conventional manner as by electro deposition, cementation, or powder techniques. It will be understood that the expression copper as used in the above regard means not only copper but other metals or alloys known in the art meeting the foregoing requirements for the coating 17 of the welding wire of the present invention.

While preferred embodiments of the present invention have been shown and described, it will be understood by those skilled in the art that various rearrangements and modifications may be made therein without departing from the spirit and scope of the invention.

I claim:

1. A welding wire comprising a steel core, a first copper coating on said steel core, a second manganese coating on said copper coating, and said first copper coating defining a substrate for said second manganese coating.

2. The welding wire of claim 1 which further comprises a third coating of copper on said second coating of manganese.

3. The welding wire of claim 1 in which said steel core is of a diameter of the order of .035 inch, said first copper coating is of a thickness in the range of 2.5 to 50 millionths of an inch, and said second manganese coating is of a thickness in the range of 25 to 90 millionths of an inch.

4. The welding wire of claim 3 in which said steel core includes a minimum of .15 percent silicon by weight.

5. The welding wire of claim 1 in which said steel core contains not more than 1.3 percent manganese by weight, said first copper coating being of a thickness in the range of 2.5 to 50 millionths of an inch, and said second manganese coating being sufficient to increase the manganese content of said welding up to approximately 5 percent by weight.

References Cited

UNITED STATES PATENTS

| | | | |
|---|---|---|---|
| 1,841,624 | 1/1932 | Mott | 29—191.6 |
| 2,637,896 | 5/1953 | Nachtman | 29—198 |
| 2,789,048 | 4/1957 | De Long et al. | 29—198 X |
| 2,789,049 | 4/1957 | De Long et al. | 29—198 X |

L. DEWAYNE RUTLEDGE, *Primary Examiner.*

E. L. WEISE, *Assistant Examiner.*

U.S. Cl. X.R.

29—191.6, 198, 196.3